US012600659B2

(12) United States Patent
Demuth

(10) Patent No.: US 12,600,659 B2
(45) Date of Patent: Apr. 14, 2026

(54) METHOD FOR HEATING MOLTEN GLASS

(71) Applicant: Messer Austria GmbH, Gumpoldskirchen (AT)

(72) Inventor: Martin Demuth, Guntramsdorf (AT)

(73) Assignee: Messer Austria GmbH, Gumpoldskirchen (AT)

( * ) Notice: Subject to any disclaimer, the term of this patent is extended or adjusted under 35 U.S.C. 154(b) by 222 days.

(21) Appl. No.: 18/245,246

(22) PCT Filed: Sep. 15, 2021

(86) PCT No.: PCT/EP2021/075358
§ 371 (c)(1),
(2) Date: Mar. 14, 2023

(87) PCT Pub. No.: WO2022/058367
PCT Pub. Date: Mar. 24, 2022

(65) Prior Publication Data
US 2023/0271867 A1 Aug. 31, 2023

(30) Foreign Application Priority Data
Sep. 15, 2020 (DE) ..................... 10 2020 005 638.5

(51) Int. Cl.
*C03B 7/06* (2006.01)
(52) U.S. Cl.
CPC .......... *C03B 7/065* (2013.01); *C03B 2211/40* (2013.01)
(58) Field of Classification Search
CPC ..... C03B 2211/40; F23D 14/32; F23D 14/22; F23C 5/28; F23C 7/02; F23L 7/007
See application file for complete search history.

(56) References Cited

U.S. PATENT DOCUMENTS 3,523,781 A    8/1970 Leveque
4,909,733 A *  3/1990 Yap ........................... F27D 7/02
                                      239/132.3
(Continued)

FOREIGN PATENT DOCUMENTS

DE    19619919 A1    8/1997
EP       2202460 A2 *  6/2010    .............. F23C 6/045
(Continued)

OTHER PUBLICATIONS

International Search Report and Written Opinion in PCT/EP2021/075358, dated Nov. 24, 2021, 8 pages, and English Translation, 6 pages.

*Primary Examiner* — Erin Snelting
*Assistant Examiner* — Steven S Lee
(74) *Attorney, Agent, or Firm* — Andrus Intellectual Property Law, LLP

(57) ABSTRACT

The invention relates to a method for heating flowable molten glass in a feed channel which is enclosed by lateral walls and a cover and into which a plurality of fuel lances and oxidizing agent lances that are mutually spaced in the flow direction of the molten glass open above the molten glass, fuel or an oxidizing agent being supplied through said lances and being brought into reaction with each other in the feed channel. The invention is characterized in that in order to combust the fuel with the oxidizing agent, a flame is produced in front of the opening of each fuel lance, said flame being designed such that adjacent or opposite flames do not contact one another.

18 Claims, 2 Drawing Sheets

(56)                References Cited

U.S. PATENT DOCUMENTS

| | | | | |
|---|---|---|---|---|
| 4,911,744 | A * | 3/1990 | Petersson | C03B 5/2353 |
| | | | | 65/135.1 |
| 5,346,524 | A * | 9/1994 | Shamp | C03B 5/2353 |
| | | | | 65/134.8 |
| 5,417,732 | A | 5/1995 | Shamp et al. | |
| 5,628,809 | A * | 5/1997 | Kobayashi | C03B 5/2353 |
| | | | | 65/157 |
| 5,814,121 | A | 9/1998 | Travis | |
| 5,833,447 | A * | 11/1998 | Bodelin | F23D 14/22 |
| | | | | 431/174 |
| 6,029,910 | A * | 2/2000 | Joshi | C03B 7/065 |
| | | | | 239/404 |
| 6,203,314 | B1 * | 3/2001 | Philippe | F23L 7/007 |
| | | | | 432/19 |
| 6,237,369 | B1 * | 5/2001 | LeBlanc | C03B 5/2353 |
| | | | | 65/134.4 |
| 6,398,547 | B1 * | 6/2002 | Joshi | F23C 15/00 |
| | | | | 432/54 |
| 8,201,418 | B2 * | 6/2012 | Leconte | C03B 5/235 |
| | | | | 65/136.2 |

| | | | | |
|---|---|---|---|---|
| 9,346,696 | B2 * | 5/2016 | Coggin, Jr. | F23D 14/32 |
| 2006/0035184 | A1 * | 2/2006 | D'Agostini | F23C 5/28 |
| | | | | 431/10 |
| 2008/0115535 | A1 * | 5/2008 | Wu | C03B 5/2353 |
| | | | | 65/134.4 |
| 2010/0300153 | A1 * | 12/2010 | Zhang | C03B 5/2353 |
| | | | | 65/335 |
| 2011/0000261 | A1 * | 1/2011 | Prabhakar | F23D 14/84 |
| | | | | 65/135.9 |
| 2012/0082946 | A1 * | 4/2012 | Lugnet | F27B 9/3011 |
| | | | | 431/8 |
| 2015/0128647 | A1 | 5/2015 | Iyoha et al. | |
| 2015/0168067 | A1 * | 6/2015 | Eichler | F27B 9/3005 |
| | | | | 432/19 |
| 2016/0340219 | A1 * | 11/2016 | Miller | C03B 5/43 |

FOREIGN PATENT DOCUMENTS

| | | | | | |
|---|---|---|---|---|---|
| EP | | 3517509 | A1 * | 7/2019 | C03B 7/06 |
| WO | WO-9004571 | A1 * | 5/1990 | | F23C 7/02 |
| WO | | 199406723 | A1 | 3/1994 | |
| WO | | 2015048405 | A1 | 4/2015 | |

* cited by examiner

METHOD FOR HEATING MOLTEN GLASS

CROSS-REFERENCE TO RELATED APPLICATIONS

The present application is the U.S. national stage application of international application PCT/EP2021/075358, filed Sep. 15, 2021, which international application was published on Mar. 24, 2022, as International Publication WO 2022/058367 A1. The international application claims priority to German Patent Application No. 10 2020 005 638.5 filed Sep. 15, 2020. The above-noted applications are hereby incorporated herein by reference.

FIELD

The invention relates to a method for heating a flowing glass melt in a feeder channel encased by side walls and a ceiling, where a plurality of fuel lances, arranged with spacing from one another in the flow direction of the glass melt, and oxidant lances open into said channel above the glass melt, where fuel and oxidant, respectively, are supplied through said lances and reacted with one another in the feeder channel. The invention also relates to an apparatus for implementing the method of the invention.

BACKGROUND

Feeders are used in glass production especially for transporting glass in the liquid state, melted in a melting furnace, for further processing. The liquid glass (glass melt) routed through the feeder channel is, for example, shaped at the end of the feeder, in the feeder head, into droplets, by means of cooled knives, and these droplets are processed to the finished glass product in further processing steps or are otherwise supplied for further processing.

In order to ensure high quality of the glass produced, the temperature conditions in the feeder must be adhered to very accurately. The feeder channel is therefore divided customarily into multiple zones, succeeding one another in the flow direction of the glass melt, which each possess a temperature regulation circuit. The glass melt in the feeder channel is heated here customarily either electrically through heating resistances or chemically, by means of burners or lances, which introduce a fuel and an oxidant into the feeder channel, where they are reacted.

A "burner" in the context of the present invention is to be understood as a device at which fuel and oxidant are carried together—either via separate feed lines within a burner head or as a mixture via a common feed line communicating fluidically with supply lines for fuel and for oxidant—into a treatment space, more particularly a feeder channel A "lance", conversely, is intended to denote a device having a usually tubular feed line by means of which only one medium—in the context of the present invention, fuel or oxidant—is carried into a treatment space (feeder channel).

A feeder is presently heated usually using burners which, viewed in the flow direction of the glass, are arranged with spacing from one another in the side walls or the ceiling of the feeder channel. The burners are generally fuel-air burners or fuel-oxygen burners (oxyfuel burners). The burners for this purpose either have supply lines for fuel and oxidant that run parallel to one another and open out jointly at a burner end face into the feeder channel, or fuel and oxidant are mixed with one another within the burner or even before reaching the burner, and the resultant mixture is carried via a common supply line into the feeder channel. In all cases, a flame develops in use directly in front of the aperture opening of the burner, and the surface of the glass melt is heated by thermal radiation from the flame. The burners are usually arranged in the side walls of the feeder channel in such a way that the flames extending from them are directed substantially parallel to the surface of the glass melt and perpendicular to its flow direction. Arrangements of this kind are described for example in U.S. Pat. Nos. 3,523,781 A1, 5,417,732 B1, 5,814,121 B1 or WO 2015 048 405 A1.

Effective flow of the glass melted in the melting furnace through the feeder requires high temperatures of about 1100 C to 1400° C. In this context, an extremely uniform temperature distribution within the feeder channel plays a large part with regard to the quality of the glass produced. In order to avoid local overheating, feeders which operate with a fuel-air burner technology require a comparatively large number of burners arranged in the longitudinal extent of the feeder channel, which, however, represent a considerable cost factor.

As a result of their improved heat transfer, based in particular on more intense thermal radiation due to a smaller fraction of ballast materials, such as nitrogen, in the furnace atmosphere, fuel-oxygen burners enable more even heating of the material in the feeder, as compared with fuel-air burners, and hence enable improved uniformity of temperature in the glass melt. Because of the drop in the nitrogen ballast in the exhaust gas, the fuel consumption is significantly reduced, customarily more than halved. At the same time it is possible to reduce the number of burners per unit distance in the feeder channel. However, the number of burners per unit distance cannot be reduced ad infinitum, since otherwise there are inhomogeneities in the temperature distribution. Consequently it is necessary to use a larger number of comparatively small oxyfuel burners, which are expensive to procure and also tend to form undesirable turbulent flows in the flame. In addition, local overheating cannot be ruled out when using fuel-oxygen burners, especially in cases of narrow feeder channels and/or in the region of the burner mouth.

WO 9406723 A1 discloses, conversely, a feeder channel where, for the supplying of fuel and oxidant, respective lances are employed which are arranged in alternation—as seen in the flow direction of the glass melt—in the side walls of the feeder channel. The lances in the two side walls are arranged with offsetting from one another, so that each fuel lance has an oxidant lance opposite it. In longitudinal direction, the lances have spacing from one another which is such that the media flows do not mix in the region close to the side walls, and hence there is no combustion there; instead, the media flows emerging from the lances meet one another in the middle of the feeder channel, where they form a turbulent flame cloud which is intended to uniformly heat the glass melt in the feeder channel.

In comparison to the installation of burners, this subject matter is much more cost-effective, but a disadvantage is that the concentrated combustion in the center of the feeder channel causes local reduction in the density of the furnace atmosphere. The associated "thermic lift" drives the hot exhaust gasses, but also the flame cloud itself, in the direction of the ceiling of the feeder channel, thereby diminishing the heat exposure of the glass melt and producing heat losses, while at the same time the ceiling material receives a substantial thermal load.

SUMMARY

It is the object of the invention, therefore, to specify a method for heating molten glass in a feeder channel that avoids the disadvantages of the prior art.

This object, in the case of a method of the type and defined purpose stated at the outset, is achieved in that for the combustion of the fuel with the oxidant, at each fuel lance a fuel material jet is generated which enters the feeder channel substantially laminarly and is reacted with oxidant present in the feeder channel to form respectively a flame.

In the invention, then, the fuel is carried from the fuel lances with an extremely laminar flow into the feeder channel, where it forms an at least largely laminar fuel jet that prevents premature turbulent mixing of fuel with oxidant. On combustion, accordingly, slim, straight flames of high stability are produced which each begin with a spacing from the opening of a fuel lance and protrude deep into the feeder channel, where they preferably do not make contact with one another or with the opposite wall of the feeder channel. In this way, firstly, the material of the walls and ceiling of the feeder channel is preserved, and secondly the formation of a turbulent flame cloud in the feeder channel, with the attendant disadvantages, is avoided. The individual flames developing in front of the fuel lances result in efficient and uniform heating of the glass flow in the feeder with low $NO_x$ emissions at the same time.

In the case of the present invention as well, as similarly to the subject matter of WO 9406723 A1, lances for fuel and oxidant are employed that are arranged with spacing from one another—as viewed in the flow direction of the glass—in the side walls of the feeder channel. In the invention here, however, a flame cloud is not formed. Similarly to the subject matter whereby burners are employed for heating the feeder channel, it is heated by means of individual flames spaced apart from one another. The structure of the flames, however, is fundamentally different from those formed by burners, since the oxygen needed for combustion is not carried into the heart of the flame simultaneously with the fuel, but instead comes from oxidant lances which are spaced apart from the fuel lances, and therefore diffuses into the fuel jet from the region surrounding the fuel jet emerging from the fuel lances. Combustion therefore takes place only in a comparatively thin shear region at the flame margin. The flame volume, accordingly, is substoichiometric overall and consists in its interior predominantly—with a fraction which decreases of course over the length of the flame—of fuel. Only in the region of the flame tip are fuel and oxidant mixed with an intensity such that there is complete combustion of the remaining fuel.

The design of the flames is influenced in particular by the cross-sectional area of the opening apertures of the fuel lances and by the flow rate of the fuel flow. The emergence velocity selected here ought to be comparatively high, and the cross-sectional area of the opening apertures of the fuel lances comparatively small, in order firstly to generate extremely slim flames and secondly to prevent combustion beginning too close to the walls of the feeder channel and hence subjecting the feeder walls to excessive thermal load. Here, preferably, the flow of the fuel on emergence from the fuel lance, and hence at the opening aperture of the fuel lance, has a Reynolds number Re of Re<10000, preferably Re<2300. As well as the fuel, the oxidant as well ought preferably to be carried into the feeder channel with a laminar flow, which likewise has a Reynolds number of Re<10000, preferably Re<2300. For the fuel and for the oxidant, however, the Reynolds number ought not to be less than Re=500, since otherwise the in that case comparatively slow flow of the emergent gas and also the flames which form ascend to the feeder ceiling, leading to a reduction in process efficiency and to increased thermal loading of the wall material.

A funnel-shaped extension to the opening apertures of the fuel lances is disadvantageous; instead, the invention prefers tubular-cylindrical fuel lances or those whose flow cross section tapers toward the opening aperture. In one particularly advantageous embodiment the fuel lances have a substantially circular or oval opening aperture whose cross-sectional area is less than 100 $mm^2$, preferably between 0.1 and 25 $mm^2$. Fuel lances of this kind are also especially suitable for installation in existing plants, in which a feeder channel is already furnished with apertures for the installation of burners, which for the purposes of the present invention, however, are fitted with burner lances and/or oxidant lances. The oxidant lances preferably have an opening aperture with a cross-sectional area of below 200 $mm^2$, preferably between 0.2 and 50 $mm^2$.

The lances of fuel and oxidant are advantageously arranged in each wall in alternation and with offsetting from one another, so that fuel lances and oxidant lances are each opposite one another in the feeder channel. As a result, any overlapping of the flames projecting into the feeder channel from both side walls is at least largely avoided. Moreover, the flame tips are each subjected intensively to oxidant, so promoting efficient, complete combustion of the fuel.

The oxidant employed comprises preferably air, oxygen-enriched air having an oxygen fraction above 21 vol %, or oxygen having a preferred purity of more than 90 vol %, and the fuel employed preferably comprises a gaseous or liquid fuel, such as natural gas or hydrogen, for example.

An apparatus suitable for implementing the method of the invention has the features of claim 8. The apparatus comprises a feeder channel having an inlet region and an outlet region, through which, with the apparatus in service, a glass melt is transported and thereby defines a flow direction. The feeding channel is heated by the separate supply of fuel and oxidant by means of fuel and oxidant lances respectively. These lances are arranged with spacing from one another, in the flow direction of the glass melt, in a side wall, both side walls and/or the ceiling of the feeder channel. At least the fuel lances, preferably the oxidant lances as well, are embodied as cylindrical pipes having a round, elliptical or oval internal cross section, with the fuel lances having a cross-sectional area of preferably below 100 $mm^2$, more preferably between 0.1 and 25 $mm^2$, and the oxidant lances having a cross-sectional area of preferably below 200 $mm^2$, more preferably between 0.2 and 50 $mm^2$. Moreover, the fuel lances and/or the oxidant lances are preferably connected operatively to a controller which allows the regulation of volume flow and velocity of the fuel emerging at each fuel lance and, respectively, of the oxidant emerging at each oxidant lance, and more particularly enables the formation of an at least largely laminar fuel jet which penetrates into the interior of the feeder channel and which is undisrupted or only minimally disrupted by turbulent flows in its surrounding region.

BRIEF DESCRIPTION OF THE DRAWINGS

An exemplary embodiment of the invention is elucidated in more detail with the drawings. In schematic views.

DETAILED DESCRIPTION

The apparatus 1 is a feeder, represented here only in a detail, for transporting and heating a glass melt. The detail concerned is, for example, the segment of a feeder in which molten glass with a temperature of 1100° C. to 1600° C., for example, is passed from a melting furnace, not represented here, to a feeder head, again not represented here, at which the glass melted in the melting furnace is chopped into droplets and supplied for further processing.

Figure 2:
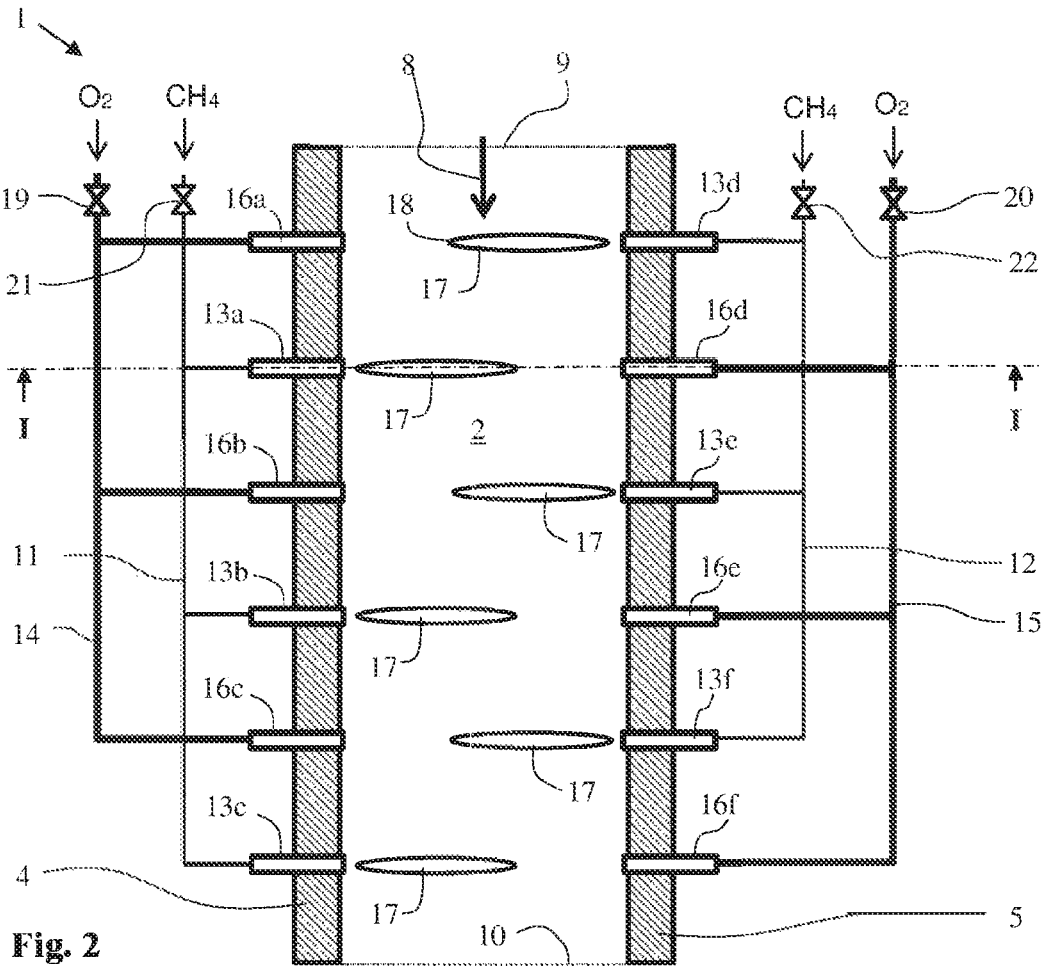
FIG. 2: shows the apparatus from FIG. 1 in a sectional view along the plane II-II in FIG. 1, and FIG. 3: shows a fuel lance of the apparatus from FIGS. 1 and 2 in longitudinal section.

The segment of the apparatus 1 that is represented here comprises a feeder channel 2, which is encased by a floor 3, side walls 4, 5 and a ceiling 6 composed of a refractory material. The purpose of the feeder channel 2 is to transport a glass melt 7, which is routed by the feeder channel 2 in the direction of the arrow 8 shown in FIG. 2 from an inlet region 9 to an outlet region 10 of the feeder channel 2.

The feeder channel 2 is heated by combustion of a fuel, such as natural gas or hydrogen, with an oxidant, such as air or oxygen with a purity of 90 vol % or more, for example. The fuel is supplied from a source—not shown here—via supply lines 11, 12, which are in fluidic communication with a plurality of fuel lances 13a, 13b, 13c, 13d, 13e, 13f. The oxidant is supplied from a source—likewise not shown here—such as an oxygen tank, for example, via supply lines 14, 15, which are in fluidic communication with oxidant lances 16a, 16b, 16c, 16d, 16e, 16f. The substantially cylindrical lances 13a, 13b, 13c, 13d, 13e, 13f; 16a, 16b, 16c, 16d, 16e, 16f in the exemplary embodiment shown here open substantially perpendicularly to the flow direction of the glass melt 7 (arrow 8) into the feeder channel 2, but may also be inclined, having more particularly an arrangement inclined in the direction of the melt and/or in or against the flow direction 8 of the glass melt 7. The fuel lances 13a, 13b, 13c, 13d, 13e, 13f and the oxidant lances 16a, 16b, 16c, 16d, 16e, 16f are arranged in alternation in each of the side walls 4, 5; in other words, in the flow direction of the glass melt 7, fuel lances 13a, 13b, 13c, 13d, 13e, 13f and oxidant lances 16a, 16b, 16c, 16d, 16e, 16f alternate with one another. The fuel lances 13a, 13b, 13c and the oxidant lances 16a, 16b, 16c here are arranged in the side wall 4 with offsetting from the fuel lances 13d, 13e, 13f and the oxidant lances 16d, 16e, 16f in the side wall 5 in a manner such that in each case one fuel lance 13a, 13b, 13c, 13d, 13e, 13f and one oxidant lance 16a, 16b, 16c, 16d, 16e, 16f open out oppositely into the feeder channel 2.

In the operation of the apparatus 1, fuel is introduced via the fuel lances 13a, 13b, 13c, 13d, 13e, 13f and oxidant via the oxidant lances 16a, 16b, 16c, 16d, 16e, 16f into the feeder channel 2 in a stoichiometric ratio to one another. Here it is ensured that at least the fuel flow at the opening aperture of the fuel lances 13a, 13b, 13c, 13d, 13e, 13f flows into the feeder channel 2 as a very largely laminar free jet. To generate the laminar flow, the fuel is carried into the feeder channel 2 preferably with a Reynolds number of Re<10000, preferably between Re=500 and Re=2300. As a result of the laminar flow of the fuel, there is only slight mixing with the oxidant supplied from the oxidant lances 16a, 16b, 16c, 16d, 16e, 16f; significant mixing takes place only in a shear region around a free jet consisting of at least virtually pure fuel, this jet forming in front of the opening aperture of the fuel lances 13a, 13b, 13c, 13d, 13e, 13f.

In order to set the combustion in train, the atmosphere in the interior of the feeder channel 2, before the introduction of the fuel and/or of the oxidant, is brought to a temperature which is above the ignition temperature of the mixture of fuel and oxidant, for example. The largely laminar flow of the fuel emerging from the fuel lances 13a, 13b, 13c, 13d, 13e, 13f leads to combustion only within the stated shear region. This results in slim, stable flames 17 which begin with a spacing in front of the opening apertures of the fuel lances 13a, 13b, 13c, 13d, 13e, 13f, project deeply into the interior of the feeder channel 2, and at a flame tip 18—shown here, for reasons of clarity, only at the flame 17 in front of the opening of the fuel lance 13d—at which the oxidant has completely penetrated the fuel jet and consequently there is complete combustion of the remaining fuel. Because of their narrow, elongated shape, adjacent flames 17 make no contact or only minimal contact with one another.

The quantities and flow rates of the streams of fuel and oxidant emerging at the lances (13a, 13b, 13c, 13d, 13e, 13f; 16a, 16b, 16c, 16d, 16e, 16f) are continually monitored and regulated at adjustment valves 19, 20, 21, 22 by means of a control unit, not shown here, as a function of measured parameters, such as, for example, a temperature in the feeder channel 2 or in the glass melt 7 or the NOx content in the exhaust gas line 24. The regulation ought in particular to take place in such a way that the flame tips 18 of the flames 17 end with a spacing from the respectively opposite side wall 5, 4 and that the temperature range does not overshoot or undershoot a defined, specified temperature range in the feeder channel 2 or in the glass melt 7.

Instead of or in addition to the arrangement of the fuel lances 13a, 13b, 13c, 13d, 13e, 13f and the oxidant lances 16a, 16b, 16c, 16d, 16e, 16f in the side walls 4, 5, lances for fuel and oxidant—likewise in alternating order—may also be provided in the ceiling 6, as indicated by the lance 23. Within the realm of the invention it is also conceivable for the fuel lances 13a, 13b, 13c, 13d, 13e, 13f and the oxidant lances 16a, 16b, 16c, 16d, 16e, 16f to be arranged in the side walls 4, 5 and/or in the ceiling 6 in such a way that the streams of material emanating from them are directed at least with a directional component parallel or opposite to the flow direction 8 of the glass melt 7.

Figure 1:
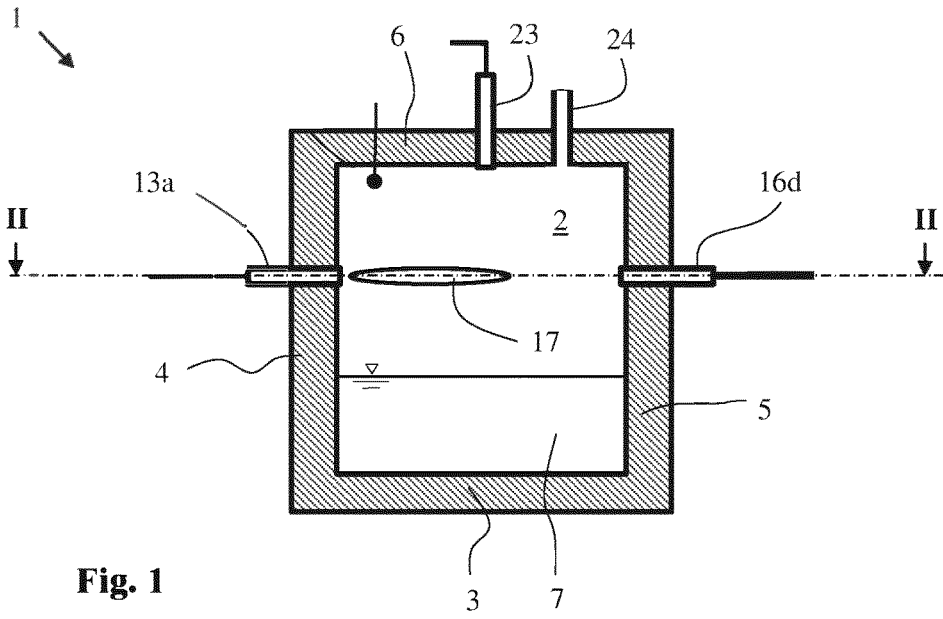
FIG. 1: shows an apparatus for implementing the method of the invention in a cross section perpendicular to the flow direction of the glass melt.
Figure 3:
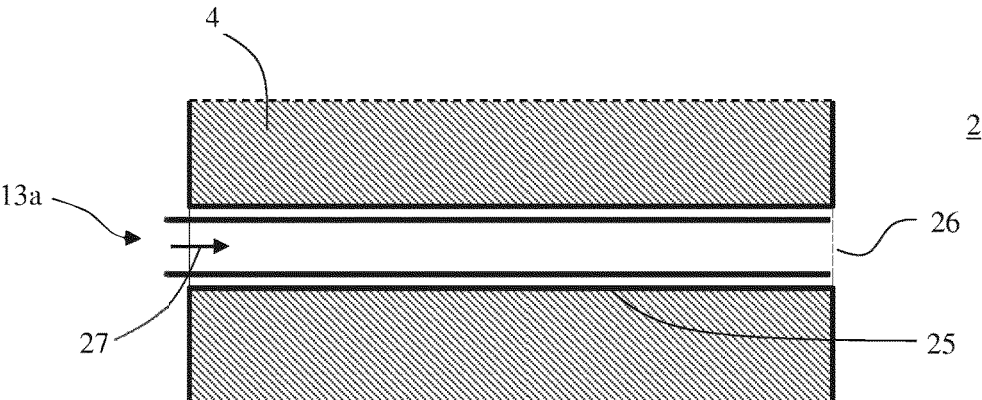

The structure of the front portion of a fuel lance 13a, 13b, 13c, 13d, 13e, 13f is shown using the example of the fuel lance 13a in FIG. 3. The fuel lance 13a takes the form of a cylindrical pipe having an internal cross section which is circular for example, is routed through a passage 25 in the side wall 4—of which only portions are shown here—and opens out at the end face with an opening aperture 26 which finishes approximately flush with the inner wall of the side wall 4. The fuel is conveyed in the direction of the arrow 27 through the fuel lance 13a. The cylindrical structure of the fuel lance 13a and its internal cross section of less than 100 mm$^2$ in area allow it to be installed even in existing feeder channels which are equipped for passages 25 designed for small burners. The oxidant lances 16a, 16b, 16c, 16d, 16e, 16f may be embodied, similarly, as cylindrical pipes, in which case their internal cross section is preferably less than 200 mm$^2$.

The apparatus 1 of the invention leads to a very uniform heating of the glass melt 7 in the feeder channel 2 and to very low NO$_x$ emissions. The development of a turbulent flame cloud in the channel center is avoided, so boosting the efficiency of the method. In comparison to the use of burners, such as oxyfuel burners, for example, there is a considerable cost saving in terms of the installed hardware, and also the thermal load on the side walls 4, 5 and the ceiling 6 of the feeder channel is considerably lower.

The invention, in any case, is not confined to the arrangement of lances installed in alternation and/or with offsetting from one another as shown in the exemplary embodiment, but instead also embraces other arrangements of lances for fuel and for oxidant, arranged with spacing from one another in the longitudinal direction of a feeder channel, and enabling the development in the feeder channel of flames which are separate from one another.

LIST OF REFERENCE SIGNS 1 apparatus
2 channel
3 floor
4 side wall
5 side wall
6 ceiling
7 glass melt
8 arrow
9 inlet region
10 outlet region
11 supply line for fuel
12 supply line for fuel
13a-f fuel lance
14 supply line for oxidant
15 supply line for oxidant
16a-f oxidant lance
17 flame
18 flame tip
19 adjustment valve
20 adjustment valve
21 adjustment valve
22 adjustment valve
23 lance
24 exhaust gas line
25 passage
26 opening aperture (of the fuel lance)
27 arrow

The invention claimed is:

1. A method for heating a flowing glass melt in a feeder channel encased by side walls and a ceiling, the method comprising:

providing a plurality of fuel lances in the side walls, wherein the fuel lances are spaced along the side walls along the flow direction of the glass melt and each fuel lance opens into the feeder channel above the glass melt;

providing a plurality of oxidant lances in the side walls, wherein the oxidant lances are spaced along the side walls along the flow direction of the glass melt and each oxidant lance opens into the feeder channel above the glass melt such that each oxidant lance is positioned opposite a corresponding fuel lance in the plurality of fuel lances;

supplying fuel to the feeder channel via the plurality of fuel lances;

supplying oxidant to the feeder channel via the plurality of oxidant lances; and combusting the fuel from each fuel lance with the oxidant from the corresponding oxidant lance to form a flame, thereby heating the flowing glass melt;

wherein at each fuel lance, a fuel material jet is generated which enters the feeder channel substantially laminarly and is reacted with oxidant present in the feeder channel to form the flame; and wherein for the generation of the flame, a flow of the fuel on emergence from the fuel lance has a Reynolds number Re of Re<2300.

2. The method as claimed in claim 1, wherein for the generation of the flame, the flow of the fuel on emergence from the fuel lance has a Reynolds number Re of Re>500.

3. The method as claimed in claim 1, wherein the fuel lances have a substantially circular, elliptical or oval opening aperture whose cross-sectional area is less than 100 mm$^2$.

4. The method as claimed in claim 3, wherein the cross-sectional area of the opening aperture of the fuel lances is between 0.1 and 25 mm$^2$.

5. The method as claimed in claim 1, wherein the oxidant lances have a substantially circular, elliptical or oval opening aperture whose cross-sectional area is less than 200 mm$^2$.

6. The method as claimed in claim 5, wherein the cross-sectional area of the opening aperture of the oxidant lances is between 0.2 and 50 mm$^2$.

7. The method as claimed in claim 1, wherein the fuel lances and the oxidant lances are arranged in each side wall of the feeder channel in a respective row in alternation with one another and the rows in both side walls are arranged with offsetting from one another.

8. The method as claimed in claim 1, wherein the oxidant employed comprises air, oxygen-enriched air or oxygen.

9. The method as claimed in claim 1, wherein combusting the fuel with the oxidant to form the flame comprises forming a flame that is spaced apart from adjacent flames and spaced apart from the side walls and the ceiling of the feeder channel.

10. The method as claimed in claim 1, wherein combusting the fuel with the oxidant to form the flame comprises forming the flame closer to the fuel lance than to the corresponding oxidant lance.

11. The method as claimed in claim 1, wherein the oxidant enters the feeder channel via the oxidant lances substantially laminarly and is reacted with the fuel in the fuel material jet from the corresponding fuel lance.

12. The method as claimed in claim 1, wherein the fuel and the oxidant are each supplied to the feeder channel in substantially laminar flows, thereby generating substantially laminar flames without flame clouds.

13. The method as claimed in claim 1, wherein the oxidant from each oxidant lance mixes with the fuel from the corresponding fuel lance in the fuel material jet formed by the corresponding fuel lance.

14. The method as claimed in claim 13, wherein the oxidant from each oxidant lance mixes with the fuel from the corresponding fuel lance only in a shear region proximate a tip of the fuel material jet formed by the corresponding fuel lance.

15. The method as claimed in claim 1, further comprising controlling the flow of fuel and oxidant into the feeder channel via the plurality of fuel lances and the plurality of oxidant lances, respectively, such that the fuel is reacted with the oxidant in only a shear region at the fuel material jet.

16. The method as claimed in claim 15, wherein controlling the flow of the fuel into the feeder channel comprises controlling a flow rate of fuel to the plurality of fuel lances; and wherein controlling the flow of the oxidant into the feeder channel comprises controlling a flow rate of oxidant to the plurality of oxidant lances.

17. The method as claimed in claim 1, wherein supplying fuel to the feeder channel via the plurality of fuel lances comprises conveying fuel through the side walls via a tubular body of each of the fuel lances;

wherein the tubular body of each fuel lance has a cross-sectional area that does not change along a length of the tubular body.

18. The method as claimed in claim 1, wherein each oxidant lance in the plurality of oxidant lances is provided with a cross-sectional area that is greater than a cross-sectional area of the corresponding fuel lance in the plurality of fuel lances.

\* \* \* \* \*